United States Patent
Lee et al.

(10) Patent No.: US 11,621,591 B2
(45) Date of Patent: Apr. 4, 2023

(54) BEAMFORMING GENERATION METHOD IN SYSTEM FOR SIMULTANEOUSLY TRANSMITTING WIRELESS INFORMATION AND POWER, AND RECORDING MEDIUM AND APPARATUS FOR PERFORMING SAME

(71) Applicant: Korea University Research and Business Foundation, Seoul (KR)

(72) Inventors: Inkyu Lee, Seoul (KR); Seokju Jang, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 17/284,867

(22) PCT Filed: May 7, 2019

(86) PCT No.: PCT/KR2019/005399
§ 371 (c)(1),
(2) Date: Apr. 13, 2021

(87) PCT Pub. No.: WO2020/080629
PCT Pub. Date: Apr. 23, 2020

(65) Prior Publication Data
US 2021/0399588 A1 Dec. 23, 2021

(30) Foreign Application Priority Data
Oct. 18, 2018 (KR) .................. 10-2018-0124348

(51) Int. Cl.
*H02J 50/23* (2016.01)
*H02J 50/40* (2016.01)
(Continued)

(52) U.S. Cl.
CPC .............. *H02J 50/23* (2016.02); *H02J 50/40* (2016.02); *H04B 7/0617* (2013.01); *H04B 7/0632* (2013.01); *H04B 17/336* (2015.01)

(58) Field of Classification Search
CPC .......... H02J 50/23; H02J 50/40; H02J 50/001; H04B 7/0617; H04B 7/0632; H04B 17/336
See application file for complete search history.

(56) References Cited

U.S. PATENT DOCUMENTS 9,408,155 B2    8/2016 Rajakarunanayake
2017/0353869 A1* 12/2017 Sen ........................ H04W 40/02
(Continued)

FOREIGN PATENT DOCUMENTS

EP      3 376 683 A1     9/2018
KR      10-2009-0115490 A   11/2009
(Continued)

OTHER PUBLICATIONS

Seokju Jang et al., Energy Efficient SWIPT Systems in Multi-Cell MISO Networks, Oct. 16, 2018.*
(Continued)

*Primary Examiner* — Daniel Cavallari
*Assistant Examiner* — Rasem Mourad
(74) *Attorney, Agent, or Firm* — NSIP Law

(57) ABSTRACT

A beamforming method in a simultaneous wireless information and power transfer system and an apparatus therefor may derive a transmission signal transmitted to a plurality of information users and a plurality of energy users from a base station having an $N_T$ (here, $N_T$ is a natural number) number of antennas included in each cell, derive a SINR (Signal to Interference plus Noise Ratio) of an $i^{th}$ (here, i is a natural number) information user by using a noise power of the $i^{th}$ (here, i is a natural number) information user included in a (Continued)

$m^{th}$ (here, m is a natural number) cell, derive a harvested power of a $j^{th}$ (here, j is a natural number) energy user included in the $m^{th}$ (here, m is a natural number) cell, and perform beamforming by using a transmission signal power at the base station and a total harvested power of the plurality of energy users receiving a transmission signal from the base station. Accordingly, it is possible to improve the effect of minimizing the transmission power of the base station and maximizing the harvested power of the energy users while satisfying the QoS (Quality of Service) and transmission power limitation of the information users.

9 Claims, 30 Drawing Sheets

(51) Int. Cl.
*H04B 17/336* (2015.01)
*H04B 7/06* (2006.01)

(56) References Cited

U.S. PATENT DOCUMENTS

2018/0109150 A1* 4/2018 Khan ................ H02J 50/40
2020/0295817 A1* 9/2020 Loghin ............. H04B 7/0617

FOREIGN PATENT DOCUMENTS

| KR | 10-2011-0131954 A | 12/2011 |
| KR | 10-2011-0134971 A | 12/2011 |
| KR | 10-1697431 B1 | 1/2017 |
| KR | 10-2017-0060116 A | 5/2017 |
| KR | 10-2017-0112746 A | 10/2017 |
| KR | 10-1887526 B1 | 8/2018 |
| KR | 10-2018-0113563 A | 10/2018 |

OTHER PUBLICATIONS

Jie Xu, Multiuser MISO Beamforming for Simultaneous Wireless Information and Power Transfer (Year: 2014).*
Elena Boshkovska et al., Max-min Fair Beamforming for SWIPT Systems with Non-linear EH Model (Year: 2017).*
Xu, Jie et al., "Multiuser MISO Beamforming for Simultaneous Wireless Information and Power Transfer," *IEEE Transactions on Signal Processing,* vol. 62, No. 18, Sep. 15, 2014 (pp. 4798-4810).
International Search Report dated Aug. 6, 2019 in counterpart International Patent Application No. PCT/KR2019/005399 (2 pages in English and 2 pages in Korean).

* cited by examiner

FIG. 8

[Equation 1]

$$\mathbf{x}_m = \sum_{i \in \mathcal{U}_m^I} \mathbf{w}_{im} s_{im}^I + \sum_{j \in \mathcal{U}_m^E} \mathbf{v}_{jm} s_{jm}^E$$

FIG. 9

[Equation 2]

$$y_{im}^I = \overbrace{\mathbf{h}_{imm}^H \mathbf{w}_{im} s_{im}^I}^{\text{desired signal}} + \overbrace{\sum_{k \in \mathcal{U}_m^I \setminus \{i\}} \mathbf{h}_{imm}^H \mathbf{w}_{km} s_{km}^I}^{\text{intra-cell interference}}$$

$$+ \underbrace{\sum_{n \in \mathcal{M} \setminus \{m\}} \sum_{k \in \mathcal{U}_n^I} \mathbf{h}_{imn}^H \mathbf{w}_{kn} s_{kn}^I}_{\text{inter-cell interference}} + \underbrace{\sum_{n \in \mathcal{M}} \sum_{j \in \mathcal{U}_n^E} \mathbf{h}_{imn}^H \mathbf{v}_{jn} s_{jn}^E}_{\text{interference induced by energy signals}} + n_{im}$$

FIG. 10

[Equation 3]

$$y_{jm}^E = \sum_{n \in \mathcal{M}} \sum_{k \in \mathcal{U}_n^E} \mathbf{g}_{jmn}^H \mathbf{w}_{kn} s_{kn}^I + \sum_{n \in \mathcal{M}} \sum_{l \in \mathcal{U}_n^E} \mathbf{g}_{jmn} \mathbf{v}_{ln} s_{ln}^E + n_{jm}$$

FIG. 11

[Equation 4]

$$\mathrm{SINR}_{im} = \frac{|\mathbf{h}_{imm}^H \mathbf{w}_{im}|^2}{\sum_{k \in \mathcal{U}_m^I \setminus \{i\}} |\mathbf{h}_{imm}^H \mathbf{w}_{km}|^2 + \sum_{n \in \mathcal{M} \setminus \{m\}} \sum_{k \in \mathcal{U}_n^I} |\mathbf{h}_{imn}^H \mathbf{w}_{kn}|^2 + \sum_{n \in \mathcal{M}} \sum_{j \in \mathcal{U}_n^E} |\mathbf{h}_{imn}^H \mathbf{v}_{jn}|^2 + \sigma_{im}^2}$$

FIG. 12

[Equation 5]

$$E_{jm}^{Linear} = \eta_{jm} P_{jm}^{EH}$$

FIG. 13

[Equation 6]

$$E_{jm}^{Nonlinear} = \frac{\frac{M_{jm}}{1+\exp\left(-a_{jm}\left(P_{jm}^{EH}-b_{jm}\right)\right)} - M_{jm}\Omega_{jm}}{1-\Omega_{jm}}$$

FIG. 14

[Equation 7]

$$\Omega_{jm} \triangleq \frac{1}{1+\exp\left(a_{jm}\, b_{jm}\right)}$$

FIG. 15

[Equation 8]

$$P_{jm}^{EH} \triangleq \mathbb{E}\left[|y_{jm}^E|^2\right] = \sum_{n\in\mathcal{M}}\left(\sum_{k\in\mathcal{U}_n^I}|\mathbf{g}_{jmn}^H\mathbf{w}_{kn}|^2 + \sum_{l\in\mathcal{U}_n^E}|\mathbf{g}_{jmn}^H\mathbf{v}_{ln}|^2\right)$$

FIG. 16

[Equation 9]

$$\max \text{EHE} = \frac{\text{total harvested power of energy users}}{\text{transmission power at base station}} = \frac{\sum_{m \in M} \sum_{j \in u_m^E} E_{jm}}{P_{total}}$$

FIG. 17

[Equation 10]

$$P_{total} = \sum_{m \in M} \left( \sum_{i \in U_m^I} \|w_{im}\|^2 + \sum_{j \in U_m^E} \|v_{jm}\|^2 + P_{C,m} \right)$$

FIG. 18

[Equation 11]

$$\max_{\{\bar{\mathbf{w}}_{km}, \bar{\mathbf{v}}_{lm}\}, \alpha} \sum_{m \in \mathcal{M}} \left( \sum_{k \in \mathcal{U}_m^I} \bar{\mathbf{w}}_{km}^H \mathbf{G}_m \bar{\mathbf{w}}_{km} + \sum_{l \in \mathcal{U}_m^E} \bar{\mathbf{v}}_{lm}^H \mathbf{G}_m \bar{\mathbf{v}}_{lm} \right)$$

$$s.t. \quad \overline{\text{SINR}}_{im} \geq \gamma_{im}, \forall i \in \mathcal{U}_m^I, \forall m \in \mathcal{M},$$

$$\sum_{k \in \mathcal{U}_m^I} \|\bar{\mathbf{w}}_{km}\|^2 + \sum_{l \in \mathcal{U}_m^E} \|\bar{\mathbf{v}}_{lm}\|^2 \leq \alpha P_{T,m}, \forall m \in \mathcal{M},$$

$$\sum_{m \in \mathcal{M}} \left( \sum_{k \in \mathcal{U}_m^I} \|\bar{\mathbf{w}}_{km}\|^2 + \sum_{l \in \mathcal{U}_m^E} \|\bar{\mathbf{v}}_{lm}\|^2 + \alpha P_{C,m} \right) = 1$$

FIG. 19

[Equation 12]

$$\overline{\text{SINR}}_{im} = \frac{|\mathbf{h}_{imm}^H \bar{\mathbf{w}}_{im}|^2}{\sum_{k \in \mathcal{U}_m^I \setminus \{i\}} |\mathbf{h}_{imm}^H \bar{\mathbf{w}}_{km}|^2 + \sum_{n \in \mathcal{M} \setminus \{m\}} \sum_{k \in \mathcal{U}_n^I} |\mathbf{h}_{imn}^H \bar{\mathbf{w}}_{kn}|^2 + \sum_{n \in \mathcal{M}} \sum_{l \in \mathcal{U}_n^E} |\mathbf{h}_{imn}^H \bar{\mathbf{v}}_{ln}|^2 + \sigma_{im}^2 \alpha}$$

FIG. 20

[Equation 13]

$$\max_{\{\bar{\mathbf{w}}_{km},\bar{\mathbf{v}}_{lm}\},\alpha} f_1\left(\{\bar{\mathbf{w}}_{km},\bar{\mathbf{v}}_{lm}\},\alpha\right) \triangleq \frac{\sum_{m\in\mathcal{M}}\left(\sum_{k\in\mathcal{U}_m^I}\bar{\mathbf{w}}_{km}^H\mathbf{G}_m\bar{\mathbf{w}}_{km} + \sum_{l\in\mathcal{U}_m^E}\bar{\mathbf{v}}_{lm}^H\mathbf{G}_m\bar{\mathbf{v}}_{lm}\right)}{\sum_{m\in\mathcal{M}}\left(\sum_{k\in\mathcal{U}_m^I}\|\bar{\mathbf{w}}_{km}\|^2 + \sum_{l\in\mathcal{U}_m^E}\|\bar{\mathbf{v}}_{lm}\|^2 + \alpha P_{C,m}\right)}$$

$$s.t. \quad \overline{\text{SINR}}_{im} \geq \gamma_{im}, \forall i \in \mathcal{U}_m^I, \forall m \in \mathcal{M},$$

$$\sum_{k\in\mathcal{U}_m^I}\|\bar{\mathbf{w}}_{km}\|^2 + \sum_{l\in\mathcal{U}_m^E}\|\bar{\mathbf{v}}_{lm}\|^2 \leq \alpha P_{T,m}, \forall m \in \mathcal{M}$$

FIG. 21

[Equation 14]

$$\max_{\{\bar{\mathbf{W}}_{km} \succeq 0, \bar{\mathbf{V}}_{lm} \succeq 0\}, \alpha} \sum_{m \in \mathcal{M}} \left( \sum_{k \in \mathcal{U}_m^I} \text{tr}\left(\mathbf{G}_m \bar{\mathbf{W}}_{km}\right) + \sum_{l \in \mathcal{U}_m^E} \text{tr}\left(\mathbf{G}_m \bar{\mathbf{V}}_{lm}\right) \right)$$

$$\text{s.t.} \quad \overline{\text{SINR}}_{im}^{SDR} \geq \gamma_{im}, \forall i \in \mathcal{U}_m^I, \forall m \in \mathcal{M},$$

$$\sum_{k \in \mathcal{U}_m^I} \text{tr}\left(\bar{\mathbf{W}}_{km}\right) + \sum_{l \in \mathcal{U}_m^E} \text{tr}\left(\bar{\mathbf{V}}_{lm}\right) \leq \alpha P_{T,m}, \forall m \in \mathcal{M},$$

$$\sum_{m \in \mathcal{M}} \left( \sum_{k \in \mathcal{U}_m^I} \text{tr}\left(\bar{\mathbf{W}}_{km}\right) + \sum_{l \in \mathcal{U}_m^E} \text{tr}\left(\bar{\mathbf{V}}_{lm}\right) + \alpha P_{C,m} \right) = 1$$

FIG. 22

[Equation 15]

$$\overline{\text{SINR}}_{im}^{\text{SDR}} = \frac{\text{tr}\left(\mathbf{H}_{imm}\bar{\mathbf{W}}_{im}\right)}{\sum\limits_{k\in\mathcal{U}_m^I\setminus\{i\}} \text{tr}\left(\mathbf{H}_{imm}\bar{\mathbf{W}}_{km}\right) + \sum\limits_{n\in\mathcal{M}\setminus\{m\}}\sum\limits_{k\in\mathcal{U}_n^I} \text{tr}\left(\mathbf{H}_{imn}\bar{\mathbf{W}}_{kn}\right) + \sum\limits_{n\in\mathcal{M}}\sum\limits_{l\in\mathcal{U}_n^E} \text{tr}\left(\mathbf{H}_{imn}\bar{\mathbf{V}}_{ln}\right) + \sigma_{im}^2\alpha}$$

FIG. 23

[Equation 16]

$$\max_{\{\mathbf{w}_{km}, \mathbf{v}_{lm}\}} \frac{\sum_{m \in \mathcal{M}} \sum_{l \in \mathcal{U}_m^E} \frac{M_{lm}}{1-\Omega_{lm}} \left( \frac{1}{1+\exp\left(-a_{lm}\left(P_{lm}^{EH}-b_{lm}\right)\right)} - \Omega_{lm} \right)}{\sum_{m \in \mathcal{M}} \left( \sum_{k \in \mathcal{U}_m^I} \|\mathbf{w}_{km}\|^2 + \sum_{l \in \mathcal{U}_m^E} \|\mathbf{v}_{lm}\|^2 + P_{C,m} \right)}$$

$$\text{s.t.} \quad \text{SINR}_{im} \geq \gamma_{im}, \forall i \in \mathcal{U}_m^I, \forall m \in \mathcal{M},$$

$$\sum_{k \in \mathcal{U}_m^I} \|\mathbf{w}_{km}\|^2 + \sum_{l \in \mathcal{U}_m^E} \|\mathbf{v}_{lm}\|^2 \leq P_{T,m}, \forall m \in \mathcal{M}$$

FIG. 24

[Equation 17]

$$\hat{q}^* = \frac{U\left(\{\mathbf{w}^*_{km}, \mathbf{v}^*_{lm}\}\right)}{U_{TP}\left(\{\mathbf{w}^*_{km}, \mathbf{v}^*_{lm}\}\right)} = \max_{\{\mathbf{w}_{km}, \mathbf{v}_{lm}\} \in \mathcal{F}} \frac{U\left(\{\mathbf{w}_{km}, \mathbf{v}_{lm}\}\right)}{U_{TP}\left(\{\mathbf{w}_{km}, \mathbf{v}_{lm}\}\right)}$$

FIG. 25

[Equation 18]

$$T(\hat{q}^*) = \max_{\{\mathbf{w}_{km}, \mathbf{v}_{lm}\} \in \mathcal{F}} U(\{\mathbf{w}_{km}, \mathbf{v}_{lm}\}) - \hat{q}^* U_{TP}(\{\mathbf{w}_{km}, \mathbf{v}_{lm}\}) = 0$$

FIG. 26

[Equation 19]

$$\max_{\{\mathbf{w}_{km}, \mathbf{v}_{lm}\}} U(\{\mathbf{w}_{km}, \mathbf{v}_{lm}\}) - \hat{q} U_{TP}(\{\mathbf{w}_{km}, \mathbf{v}_{lm}\})$$

$$\text{s.t.} \quad \text{SINR}_{im} \geq \gamma_{im}, \forall i \in \mathcal{U}_m^I, \forall m \in \mathcal{M},$$

$$\sum_{k \in \mathcal{U}_m^I} \|\mathbf{w}_{km}\|^2 + \sum_{l \in \mathcal{U}_m^E} \|\mathbf{v}_{lm}\|^2 \leq P_{T,m}, \forall m \in \mathcal{M}$$

FIG. 27

[Equation 20]

$$\max_{\{\mathbf{w}_{km}, \mathbf{v}_{lm}, \rho_{lm}\}} \sum_{m \in \mathcal{M}} \sum_{l \in \mathcal{U}_m^E} \hat{U}(\rho_{lm}) - \hat{q} U_{TP}(\{\mathbf{w}_{km}, \mathbf{v}_{lm}\})$$

$$\text{s.t.} \sum_{n \in \mathcal{M}} \left( \sum_{k \in \mathcal{U}_n^I} |\mathbf{g}_{jmn}^H \mathbf{w}_{kn}|^2 + \sum_{l \in \mathcal{U}_n^E} |\mathbf{g}_{jmn}^H \mathbf{v}_{ln}|^2 \right) \geq \rho_{jm}, \forall j \in \mathcal{U}_m^E, \forall m \in \mathcal{M}$$

$$\text{SINR}_{im} \geq \gamma_{im}, \forall i \in \mathcal{U}_m^I, \forall m \in \mathcal{M},$$

$$\sum_{k \in \mathcal{U}_m^I} \|\mathbf{w}_{km}\|^2 + \sum_{l \in \mathcal{U}_m^E} \|\mathbf{v}_{lm}\|^2 \leq P_{T,m}, \forall m \in \mathcal{M}$$

FIG. 28

[Equation 21]

$$\max_{\{\mathbf{W}_{km},\mathbf{V}_{lm},\rho_{lm}\}} \sum_{m\in\mathcal{M}} \sum_{l\in\mathcal{U}_m^E} \hat{U}_{LB}^{(t)}(\rho_{lm}) - \hat{q}U_{TP}(\{\mathbf{W}_{km},\mathbf{V}_{lm}\})$$

$$s.t. \quad \widehat{\text{SINR}}_{im}^{SDR} \geq \gamma_{im}, \forall i \in \mathcal{U}_m^I, \forall m \in \mathcal{M},$$

$$\sum_{k\in\mathcal{U}_m^I} \text{tr}(\mathbf{W}_{km}) + \sum_{l\in\mathcal{U}_m^E} \text{tr}(\mathbf{V}_{lm}) \leq P_{T,m}, \forall m \in \mathcal{M},$$

$$\sum_{n\in\mathcal{M}} \left( \sum_{k\in\mathcal{U}_m^I} \text{tr}(\hat{\mathbf{G}}_{jmn}\mathbf{W}_{kn}) + \sum_{l\in\mathcal{U}_m^E} \text{tr}(\hat{\mathbf{G}}_{jmn}\mathbf{V}_{ln}) \right) \geq \rho_{jm}, \forall j \in \mathcal{U}_m^E, \forall m \in \mathcal{M}$$

FIG. 29

[Equation 22]

$$\widehat{\text{SINR}}_{im}^{\text{SDR}} = \frac{\text{tr}(\mathbf{H}_{imm}\mathbf{W}_{im})}{\sum_{k \in \mathcal{U}_m^I \setminus \{i\}} \text{tr}(\mathbf{H}_{imm}\mathbf{W}_{km}) + \sum_{n \in \mathcal{M} \setminus \{m\}} \sum_{k \in \mathcal{U}_n^I} \text{tr}(\mathbf{H}_{imn}\mathbf{W}_{kn}) + \sum_{n \in \mathcal{M}} \sum_{l \in \mathcal{U}_n^E} \text{tr}(\mathbf{H}_{imn}\mathbf{V}_{ln}) + \sigma_{im}^2}$$

FIG. 30

[Table 1]

| Algorithm 1 : Centralized algorithm for the non-linear EH model |
|---|
| 1: Set $\hat{q} = 0$. |
| 2: Initialize $t = 0$ and $\{\rho_{lm}^{(t)}\} = 0$. |
| 3: Let $t \leftarrow t+1$. Solve the problem [ Equation 22 ] for a given $\hat{q}$, and obtain $\{\rho_{lm}^{(t)}\}$. |
| 4: If $\{\rho_{lm}^{(t)}\}$ converge, return $\{W_{km}^*\}$ and go to step 5. Otherwise go back to step 3. |
| 5: Compute $\{w_{km}^*\}$ by EVD of $\{W_{km}^*\}$ and set $\{v_{lm}^*\} = 0$. |
| 6: If $U(\{w_{km}^*, v_{lm}^*\}) - \hat{q}U_{TP}(\{w_{km}^*, v_{lm}^*\})$ converges, return $\{w_{km}^*, v_{lm}^*\}$ and then stop. Otherwise, update $\hat{q} = \dfrac{U(\{w_{km}^*, v_{lm}^*\})}{U_{TP}(\{w_{km}^*, v_{lm}^*\})}$ and go back to step 2. |

BEAMFORMING GENERATION METHOD IN SYSTEM FOR SIMULTANEOUSLY TRANSMITTING WIRELESS INFORMATION AND POWER, AND RECORDING MEDIUM AND APPARATUS FOR PERFORMING SAME

CROSS REFERENCE TO RELATED APPLICATIONS

This application is a U.S. National Stage Application of International Application No. PCT/KR2019/005399, filed on May 7, 2019, which claims the benefit under 35 USC 119(a) and 365(b) of Korean Patent Application No. 10-2018-0124348, filed on Oct. 18, 2018, in the Korean Intellectual Property Office, the entire disclosure of which is incorporated herein by reference for all purposes.

TECHNICAL FIELD

This disclosure relates to a beamforming method in a simultaneous wireless information and power transfer system, and a recording medium and an apparatus therefor, and more particularly, to a beamforming method in a simultaneous wireless information and power transfer system, which may perform efficient beamforming in a wireless communication network environment where a transmitter and a receiver exchange RF (Radio Frequency) signals, and a recording medium and an apparatus therefor.

BACKGROUND ART

Recently, attempts to apply wireless energy transmission technology in energy constrained wireless networks are being actively made.

For example, a wireless powered communication network (WPCN) configured to wirelessly charge user terminals with signals emitted by a transmitter so that the user terminals may transmit information signals using the harvested energy is being studied.

Accordingly, experiments on a simultaneous wireless information and power transfer system to maximize a total harvested energy of energy users who harvest energy while satisfying QoS (Quality of Service) of information users are also being conducted.

However, in the existing simultaneous wireless information and power transfer system, there are various problems since optimization is not performed in consideration of power consumed by a base station, the efficiency of energy users is not considered, and a non-linear model is not considered.

PRIOR LITERATURES

Patent Literature (Patent Literature 1) Korean Unexamined Patent Publication No. 10-2017-0112746
(Patent Literature 2) Korean Patent Registration No. 10-1887526
(Patent Literature 3) US Patent U.S. Pat. No. 9,408,155 B2
(Patent Literature 4) Korean Patent Registration No. 10-1697431

Non-Patent Literature (Non-patent Literature 1) MIMO broadcasting for simultaneous wireless information and power transfer, R. Zhang and C. K. Ho, IEEE Transactions on Wireless Communications, vol. 12, No. 5, pp. 1989-2001, May 2013.

DISCLOSURE

Technical Problem

In an aspect of the present disclosure, there is provided a beamforming method in a simultaneous wireless information and power transfer system in which energy harvesting technology using an RF signal is grafted to a communication system, and a recording medium and an apparatus therefor.

The technical problem of the present disclosure is not limited to the above, and other technical problems not mentioned herein will be clearly understood by those skilled in the art from the following description.

Technical Solution

In one general aspect, there is provided a beamforming method in a simultaneous wireless information and power transfer system, comprising: deriving a transmission signal transmitted to a plurality of information users and a plurality of energy users from a base station having an $N_T$ (here, $N_T$ is a natural number) number of antennas included in each cell; deriving a SINR (Signal to Interference plus Noise Ratio) of an $i^{th}$ (here, i is a natural number) information user by using a noise power of the $i^{th}$ (here, i is a natural number) information user included in a $m^{th}$ (here, m is a natural number) cell; deriving a harvested power of a $j^{th}$ (here, j is a natural number) energy user included in the $m^{th}$ (here, m is a natural number) cell; and performing beamforming by using a transmission signal power at the base station and a total harvested power of the plurality of energy users receiving a transmission signal from the base station.

The harvested power may be derived by deriving a linear harvested power by applying the $j^{th}$ (here, j is a natural number) energy user to a linear model, deriving a non-linear harvested power by applying the $j^{th}$ (here, j is a natural number) energy user to a non-linear model, and deriving a harvested power for the $j^{th}$ (here, j is a natural number) energy user by using the derived linear and non-linear harvested powers.

The linear harvested power may be derived by using a reception signal power ($P_{jm}^E$) and a power conversion efficiency ($\eta_{jm}$) of the $i^{th}$ (here, j is a natural number) energy user of the $m^{th}$ (here, m is a natural number) cell.

The non-linear harvested power may be derived by using a maximum harvested power ($M_{jm}$), a charging rate ($a_{jm}$) and a sensitivity ($b_{jm}$) of the $i^{th}$ (here, j is a natural number) energy user of the $m^{th}$ (here, m is a natural number) cell, which are parameters of the non-linear model.

The beamforming may be performed by non-linearly optimizing the transmission signal power of the base station and the total harvested power of the energy users based on QoS (Quality of Service) of the information users.

In a computer-readable recording medium according to another embodiment of the present disclosure, a computer program for performing the beamforming method in a simultaneous wireless information and power transfer system is recorded.

A beamforming apparatus in a simultaneous wireless information and power transfer system still another embodiment of the present disclosure comprises a signal deriving unit configured to derive a transmission signal transmitted to a plurality of information users and a plurality of energy users from a base station having an $N_T$ (here, $N_T$ is a natural number) number of antennas included in each cell; a noise deriving unit configured to derive a SINR of an $i^{th}$ (here, i is a natural number) information user by using a noise power of the $i^{th}$ (here, i is a natural number) information user included in a $m^{th}$ (here, m is a natural number) cell; a harvested power deriving unit configured to derive a harvested power of a $j^{th}$ (here, j is a natural number) energy user included in the $m^{th}$ (here, m is a natural number) cell; and a forming unit configured to perform beamforming by using a transmission signal power derived by the signal deriving unit and a total harvested power of the plurality of energy users derived from the harvested power derived by the harvested power deriving unit.

The harvested power deriving unit may include a first deriving unit configured to derive a linear harvested power by applying the $j^{th}$ (here, j is a natural number) energy user to a linear model; a second deriving unit configured to derive a non-linear harvested power by applying the $j^{th}$ (here, j is a natural number) energy user to a non-linear model; and a coupling unit configured to derive a harvested power for the $j^{th}$ (here, j is a natural number) energy user by using the derived linear and non-linear harvested powers.

The first deriving unit may be configured to derive the linear harvested power by using a reception signal power ($p_{jm}^{E}$) and a power conversion efficiency ($\eta_{jm}$) of the $j^{th}$ (here, j is a natural number) energy user of the $m^{th}$ (here, m is a natural number) cell.

The second deriving unit may be configured to derive the non-linear harvested power by using a maximum harvested power ($M_{jm}$), a charging rate ($a_{jm}$) and a sensitivity ($b_{jm}$) of the $j^{th}$ (here, j is a natural number) energy user of the $m^{th}$ (here, m is a natural number) cell, which are parameters of the non-linear model.

The forming unit may be configured to non-linearly optimize the transmission signal power of the base station and the total harvested power of the energy users based on QoS (Quality of Service) of the information users.

Advantageous Effects

According to an aspect of the present disclosure described above, it is possible to perform more efficient beamforming by considering a power consumed by a base station and deriving a harvested power applied to a non-linear model as well as a linear model.

In addition, the effect of minimizing a transmission power of the base station and maximizing a harvested power of energy users while satisfying the QoS (Quality of Service) and the transmission power limitation of information users may be expected.

The effects may be obtained from the present disclosure are not limited to above, and other effects not mentioned herein will be clearly understood by those skilled in the art from the following description.

DESCRIPTION OF DRAWINGS

FIGS. 8 to 29 are [Equation 1] to [Equation 22], respectively.

FIG. 30 is [Table 1].

BEST MODE

Figure 1:
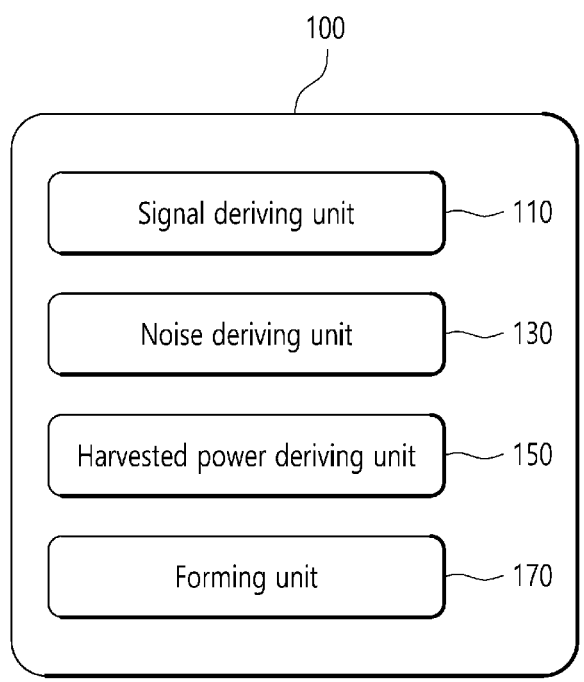
FIG. 1 is a block diagram showing a beamforming apparatus in a simultaneous wireless information and power transfer system according to an embodiment of the present disclosure.

The following detailed description of the present disclosure refer to the accompanying drawings that exemplarily illustrate specific embodiments in which the present disclosure may be implemented. These embodiments are described in sufficient detail to enable a person skilled in the art to practice the present disclosure. It should be understood that various embodiments of the present disclosure are different but need not be exclusive from each other. For example, specific shapes, structures and characteristics described herein may be implemented in other embodiments without departing from the idea and scope of the present disclosure in relation to one embodiment. In addition, it should be understood that locations or arrangement of individual components in each disclosed embodiment may be changed without departing from the idea and scope of the present disclosure. Accordingly, the following description is not intended to limit the scope, and the scope of the present disclosure, if properly described, is limited only by the appended claims, along with all scopes equivalent to the features defined in the claims. Like reference numerals in the drawings indicate the same or similar functions over several aspects.

Hereinafter, preferred embodiments of the present disclosure will be described in more detail with reference to the drawings.

The present disclosure is directed to a beamforming apparatus in a simultaneous wireless information and power transfer system, which may perform more efficient beamforming by deriving a harvested power applied to not only a linear model but also a non-linear model.

FIG. 1 is a block diagram showing a beamforming apparatus in a simultaneous wireless information and power transfer system according to an embodiment of the present disclosure.

A beamforming apparatus 100 in a simultaneous wireless information and power transfer system according to an embodiment of the present disclosure (hereinafter, referred to as a beamforming apparatus) may include a signal deriving unit 110, a noise deriving unit 130, a harvested power deriving unit 150, and a forming unit 170.

The signal deriving unit 110 may derive transmission signals transmitted to a plurality of information users and a plurality of energy users at an $m^{th}$ (here, m is a natural number) base station (BS) having an $N_T$ (here, $N_T$ is a natural number) number of antennas included in each cell.

Here, an m (here, m is a natural number) number of cells may be provided, and the cell may include one base station having an $N_T$ (here, $N_T$ is a natural number) number of antennas, a plurality of information users, and a plurality of energy users.

The base station may simultaneously transmit information and power to the plurality of information users and the plurality of energy users having a single antenna by using the $N_T$ (here, $N_T$ is a natural number) number of antennas.

The transmission signal ($x_m$) transmitted at the $m^{th}$ (here, m is a natural number) base station to the information users and the energy users may be derived through [Equation 1] in FIG. 8.

Here, $w_{im}$ may mean beamforming for an $i^{th}$ information user who receives information from the $m^{th}$ base station, and $v_{jm}$ may mean beamforming for a $j^{th}$ energy user who receives energy from the $m^{th}$ base station.

In addition, $s_{im}^I$ may mean a symbol for the $i^{th}$ information user of the $m^{th}$ cell, $s_{jm}^E$ may mean a symbol for the $j^{th}$ energy user of the $m^{th}$ cell, may mean a group of the plurality of information users of the $m^{th}$ cell, and $u_m^E$ may mean a group of the plurality of energy users of the $m^{th}$ cell.

The reception signal ($\gamma_{im}^I$) received by the $i^{th}$ (here, i is a natural number) information user of the $m^{th}$ (here, m is a natural number) cell may be derived through [Equation 2] in FIG. 9, and the reception signal ($j_{jm}^E$) received by the $j^{th}$ (here, j is a natural number) information user of the $m^{th}$ (here, m is a natural number) cell may be derived through [Equation 3] in FIG. 10.

Here, $h_{imn}$ may mean a channel between the $n^{th}$ (here, n is a natural number) base station and the $i^{th}$ information user of the $m^{th}$ cell, $g_{jmn}$ may mean a channel between the $n^{th}$ (here, n is a natural number) base station and the $j^{th}$ energy user of the $m^{th}$ cell, $n_{im}^I$ may mean a noise of the $i^{th}$ information user of the $m^{th}$ cell, and $n_{jm}^E \gamma$ may mean a noise of the $i^{th}$ energy user of the $m^{th}$ cell.

The noise deriving unit 130 may extract a noise from the reception signal of the $i^{th}$ (here, i is a natural number) information user among the plurality of information users included in the $m^{th}$ (here, m is a natural number) cell, and derive a noise power ($\sigma_{im}^2$) from the extracted noise.

The noise deriving unit 130 may derive a SINR ($SINR_{im}$, Signal to Interference plus Noise Ratio) of the $i^{th}$ (here, i is a natural number) information user of each $m^{th}$ (here, m is a natural number) cell by applying the derived noise power to [Equation 4] in FIG. 11.

The harvested power deriving unit 150 may derive a total harvested power ($E_{jm}$) by using a linear harvested power ($E_{jm}^{Linear}$) and a non-linear harvested power ($E_{jm}^{Non-Linear}$) of the $j^{th}$ (here, j is a natural number) energy user included in the $m^{th}$ (here, m is a natural number) cell.

Figure 12:
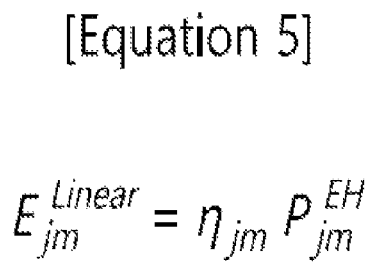

The harvested power deriving unit 150 may derive the linear harvested power ($E_{jm}^{Linear}$) by using [Equation 5] in FIG. 12.

Here, $\eta_{jm}$ is a positive number between 0 and 1 to represent the efficiency of converting the received RF signal into a power and may mean a power conversion efficiency of the $j^{th}$ energy user of the $m^{th}$ cell, and $P_{jm}^{EH}$ may mean a power of the reception signal of the $j^{th}$ energy user of the $m^{th}$ cell.

The harvested power deriving unit 150 may derive the non-linear harvested power ($E_{jm}^{Non-linear}$) by using [Equation 6] in FIG. 13.

Here, $M_{jm}$ may mean a maximum harvested power of the $j^{th}$ energy user of the $m^{th}$ cell.

In addition, $a_{jm}$ may mean a charging rate of the $j^{th}$ energy user of the $m^{th}$ cell, $b_{jm}$ may mean a sensitivity of the $j^{th}$ energy user of the $m^{th}$ cell, and $\Omega_{jm}$ may be calculated by [Equation 7] in FIG. 14 using $a_{jm}$ and $b_{jm}$.

$P_{jm}^{EH}$ that is the power of the reception signal of the $j^{th}$ energy user of the $m^{th}$ cell receiving the energy may be derived using [Equation 8] in FIG. 15.

The forming unit 170 may perform beamforming that maximizes energy harvesting efficiency (EHE) by [Equation 9] in FIG. 16 by using the power ($P_{total}$) of the transmission signal derived by the signal deriving unit 110 and a total harvested power of the plurality of energy users derived from the total harvested power ($E_{jm}$) derived by the harvested power deriving unit 150.

Here, the power ($P_{total}$) of the transmission signal may be derived using [Equation 10] in FIG. 17.

That is, maximum energy-efficient beamforming of the beamforming apparatus 100 according to an embodiment of the present disclosure may mean the total harvested power of the energy users with respect to the transmission power at the base station.

Figure 2:
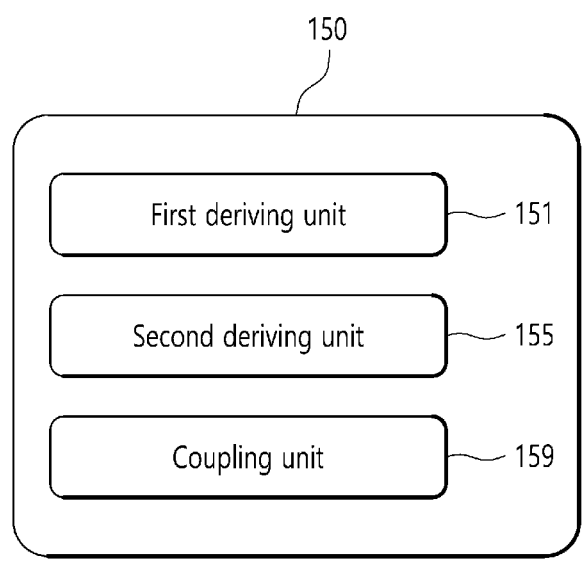
FIG. 2 is a block diagram concretely showing a harvested power deriving unit of FIG. 1.

FIG. 2 is a block diagram concretely showing a harvested power deriving unit of FIG. 1.

The harvested power deriving unit 150 of the beamforming apparatus 100 proposed by the present disclosure may include a first deriving unit 151, a second deriving unit 155, and a coupling unit 159.

The first deriving unit 151 may derive a linear harvested power ($E_{jm}^{Linear}$) by applying the $i^{th}$ (here, j is a natural number) energy user of the $m^{th}$ (here, m is a natural number) cell receiving the energy signal to a linear model such as [Equation 5] described above.

The first deriving unit 151 may derive the linear harvested power ($E_{jm}^{Linear}$) by applying to a linear model using a centralized algorithm.

First, a maximum value of the linear harvested power ($E_{jm}^{Linear}$) derived by applying to a linear model according to [Equation 5] described above by using a centralized algorithm may be calculated using [Equation 11] in FIG. 18.

Here, $G_m$ may be defined as $$G_m \triangleq \sum_{n \in M} \sum_{j \in u_n^E} \eta_{jn} g_{jnm} g_{jnm}^H, \forall m \in M, \gamma_{im}.$$

In addition, $\overline{w_{km}}$ may mean $\sqrt{\alpha} w_{km}$, $\overline{v_{lm}}$ may mean $\sqrt{\alpha} v_{lm}$, it may mean $\forall l \in u_m^I$, $\forall m \in M$, and $\overline{SINR_{im}}$ may be defined by [Equation 12] in FIG. 19.

The final equation obtained from [Equation 11] may mean [Equation 13] in FIG. 20.

Here, if rank ($\overline{w_{km}}$) is smaller than or equal to 1 and rank ($v_{lm}$) is smaller than or equal to 1, [Equation 11] may be expressed as [Equation 14] in FIG. 21.

Here, $H_{imn}$ may be defined as $h_{imn} h_{imn}^H$, it may mean $\forall i \in u_m^I$, $\forall m,n \in M$, $X \geq 0$, and $\overline{SINR_{im}^{SDR}}$ may be defined by [Equation 15] in FIG. 22.

The second deriving unit 155 may derive a non-linear harvested power ($E_{jm}^{Non-linear}$) by applying the $j^{th}$ (here, j is a natural number) energy user of the $m^{th}$ (here, m is a natural number) cell receiving the energy signal to a non-linear model such as [Equation 6] described above.

The second deriving unit 155 may derive the non-linear harvested power ($E_{jm}^{Non-linear}$) by applying to a non-linear model using a centralized algorithm.

First, a maximum value of the non-linear harvested power ($E_{jm}^{Non-linear}$) derived by applying to a non-linear model according to [Equation 6] described above by using a centralized algorithm may be calculated using [Equation 16] in FIG. 23.

[Equation 16] may be expressed as [Equation 17] in FIG. 24 and [Equation 18] in FIG. 25, and the non-linear harvested power ($E_{jm}^{Non-linear}$) may be derived using [Equation 19] in FIG. 26 therefrom.

Here, like [Equation 16], the conditions for a numerator and a denominator may be defined as $U(\{w_{km}, v_{lm}\})>0$, $U_{TP}(\{w_{km}, v_{lm}\})\geq 0$, respectively.

From the above, the maximum value f EHEq̂* may mean when T(q̂*) is 0.

[Equation 19] may be expressed as [Equation 20] in FIG. 27

Here, it may mean $$\overline{U}(\rho_{lm}) \triangleq \frac{M_{lm}}{1-\Omega_{lm}}\left(\frac{1}{1+\exp(-a_{lm}(\rho_{lm}-b_{lm}))}-\Omega_{1m}\right).$$

From the above, [Equation 21] in FIG. 28 may be calculated.

Here, it may mean $w_{km} \triangleq w_{km}w_{km}^H$, it may mean $v_{lm} \triangleq v_{lm}v_{lm}^H$, it may mean $U_{TP}(\{w_{km}, v_{lm}\}) \triangleq \sum_{m \in M}(\sum_{k \in u_m}tr(w_{km})+\sum_{l \in u_m^E}tr(v_{lm})+P_{C,m})$, it may mean $\hat{G}_{jm} \triangleq g_{jmn}g_{jmn}^H$, $\forall l, j \in u_m^E$, $\forall m$, $n \in M$, and $\overline{SINR}_{im}^{SDR}$ may be calculated using [Equation 22] in FIG. 29.

From the above, a centralized algorithm may be arranged as in [Table 1] in FIG. 30.

After setting q̂=0 and initializing as t=0, $\{\rho_{lm}^{(t)}\}=0$, [Equation 21] may be solved by increasing the t value by '1', and if $\{\rho_{lm}^{(t)}\}$ converges, $\{W_{km}^*\}$ may be solved by performing the fifth step, but otherwise, the third step may be performed again.

After performing the fifth step, if $U(\{w^*_{km}, v^*_{lm}\})-\hat{q}U_{TP}(\{w^*_{km}, v^*_{lm}\})$ converges, solving the corresponding equation may be stopped, but if not, the process may return to the second step to update $$\hat{q} = \frac{U(\{w^*_{km}, v^*_{lm}\})}{U_{TP}(\{w^*_{km}, v^*_{lm}\})}.$$

The coupling unit 159 may derive a total harvested power ($E_{jm}$) by using the linear harvested power ($E_{jm}^{Linear}$) derived by the first deriving unit 151 and the non-linear harvested power ($E_{jm}^{Non-linear}$) derived by the second deriving unit.

Hereinafter, a beamforming method in a simultaneous wireless information and power transfer system will be described in detail with reference to FIGS. 3 and 4.

Figure 3:
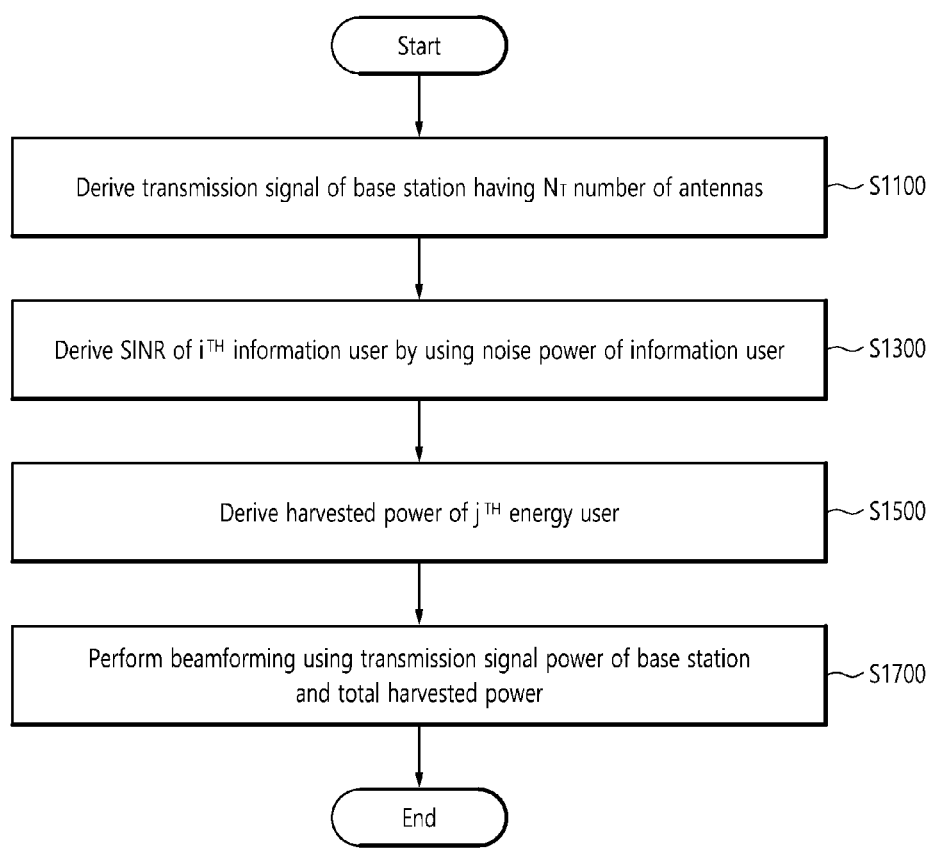
FIG. 3 is a flowchart for schematically illustrating a beamforming method in a simultaneous wireless information and power transfer system according to an embodiment of the present disclosure.

FIG. 3 is a flowchart for schematically illustrating a beamforming method in a simultaneous wireless information and power transfer system according to an embodiment of the present disclosure.

A transmission signal transmitted to a plurality of information users and a plurality of energy users from a base station (BS) having an $N_T$ (here, $N_T$ is a natural number) number of antennas included in each cell may be derived (S1100).

Here, an m (here, m is a natural number) number of cells may be provided, and the cell may include one base station having an $N_T$ (here, $N_T$ is a natural number) number of antennas, a plurality of information users, and a plurality of energy users.

The base station may simultaneously transmit information and power to the plurality of information users and the plurality of energy users having a single antenna by using the $N_T$ (here, $N_T$ is a natural number) number of antennas.

The information users and the energy users receiving the information signal and the energy signal from the $m^{th}$ (here, m is a natural number) base station may derive reception signals ($\gamma_{im}^I$, $\gamma_{jm}^E$) received from each antenna.

The noise of the $i^{th}$ (here, i is a natural number) information user among the plurality of information users receiving the information signal from the $m^{th}$ (here, m is a natural number) base station may be extracted from the derived reception signal ($\gamma_{im}^I$).

A noise power ($\sigma_{im}^2$) for the reception signal of the $i^{th}$ information user of the $m^{th}$ cell may be derived from the extracted noise, and a SINR ($SINR_{im}$, Signal to Interference plus Noise Ratio) of the $i^{th}$ information user of the $m^{th}$ cell may be derived using the derived noise power ($\sigma_{im}^2$) (S1300).

Meanwhile, a harvested power may be derived using the reception signal ($\gamma_{jm}^E$) of the $j^{th}$ (here, j is a natural number) energy user among the plurality of energy users receiving the energy signal from the $m^{th}$ (here, m is a natural number) base station (S1500).

Here, the harvested power of the energy user may be derived using the linear harvested power ($E_{jm}^{Linear}$) and the non-linear harvested power ($E_{jm}^{Non-linear}$) of the $j^{th}$ (here, j is a natural number) energy user of the $m^{th}$ (here, m is a natural number) cell.

Energy-efficient beamforming (EHE, Energy Harvesting Efficiency) may be performed using the power ($P_{total}$) of the transmission signals of the base stations having an $N_T$ (here, $N_T$ is a natural number) number of antennas and the total harvested power ($E_{jm}$) of the energy users (S1700).

That is, maximum energy-efficient beamforming of the beamforming apparatus 100 according to an embodiment of the present disclosure may mean the total harvested power of the energy users with respect to the transmission power at the base station.

Figure 4:
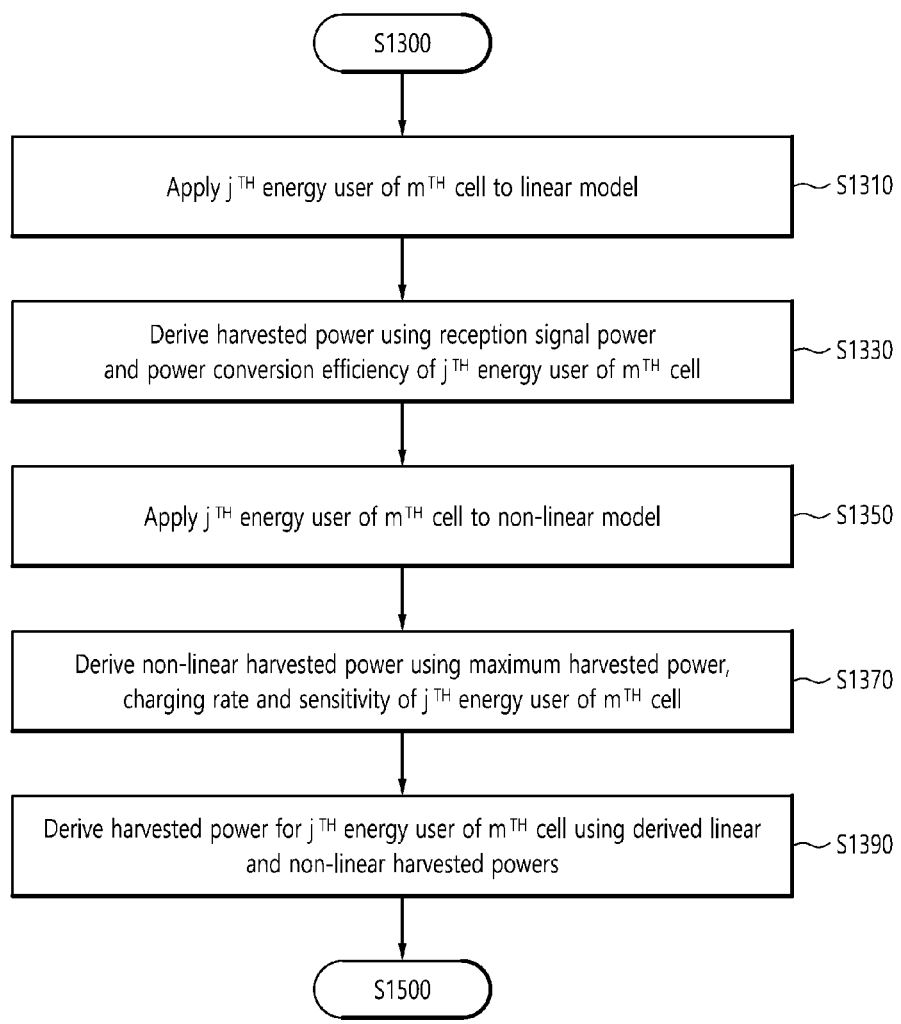
FIG. 4 is a flowchart for concretely illustrating a process of deriving a harvested power of FIG. 3.

FIG. 4 is a flowchart for concretely illustrating a process of deriving a harvested power of FIG. 3.

Among the plurality of energy users of the $m^{th}$ (here, m is a natural number) cell receiving the energy signal, the $j^{th}$ (here, j is a natural number) energy user may be applied to a linear model (S1310).

The linear harvested power ($E_{jm}^{Linear}$) may be derived using the power ($P_{jm}^{EH}$) and the power conversion efficiency ($\eta_{jm}$) of the reception signal received by the $j^{th}$ energy user of the $m^{th}$ cell from the antenna (S1330).

Here, the power conversion efficiency ($\eta_{jm}$) may mean a positive number between 0 and 1 to represent the efficiency of converting the RF signal received by the $j^{th}$ energy user of the $m^{th}$ cell from the antenna into a power.

After deriving the linear harvested power ($E_{jm}^{Linear}$) among the plurality of energy users of the $m^{th}$ (here, m is a natural number) cell receiving the energy signal, the $j^{th}$ (here, j is a natural number) energy user may be applied to a non-linear model (S1350).

The non-linear harvested power ($E_{jm}^{Non-linear}$) may be derived using the maximum harvested power ($M_{jm}$), the charging rate ($a_{jm}$) and the sensitivity ($b_{jm}$) of the $j^{th}$ energy user of the $m^{th}$ cell (S1370).

The total harvested power ($E_{jm}$) for the $j^{th}$ energy user of the $m^{th}$ cell may be derived using the derived linear harvested power and the derived non-linear harvested power ($E_{jm}^{Non-lnear}$) (S1390).

Hereinafter, an embodiment of the beamforming method in a simultaneous wireless information and power transfer system proposed by the present disclosure will be described with reference to FIGS. 5 to 7.

Figure 5:
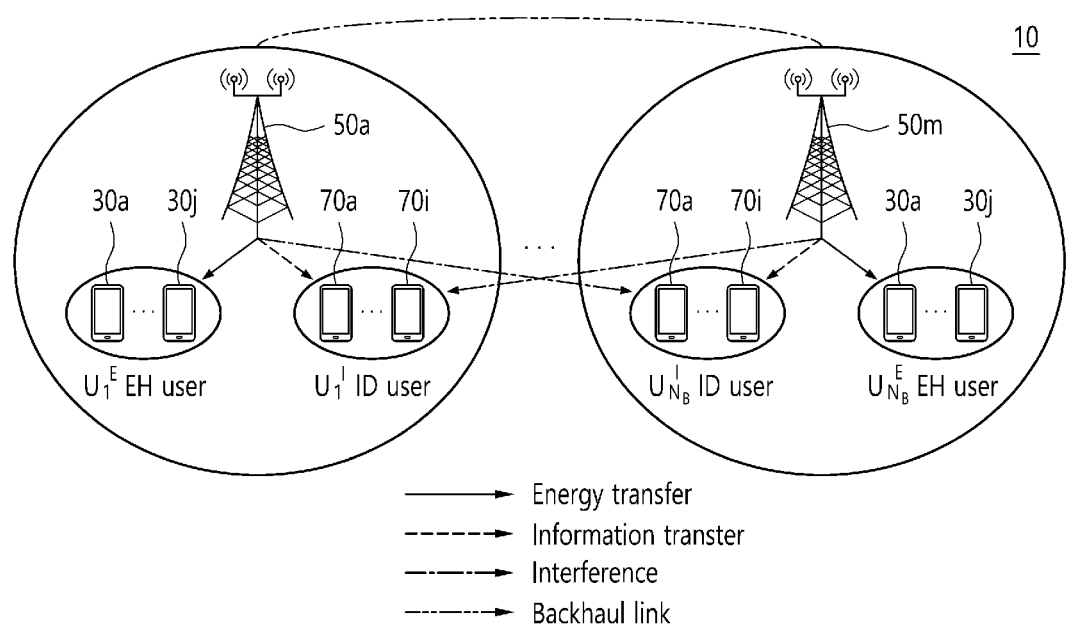
FIG. 5 is an exemplary diagram showing a simultaneous wireless information and power transfer system to which the beamforming apparatus in a simultaneous wireless information and power transfer system proposed in the present disclosure is applied.

FIG. 5 is an exemplary diagram showing a simultaneous wireless information and power transfer system 10 to which the beamforming apparatus in a simultaneous wireless information and power transfer system 10 proposed in the present disclosure is applied.

The present disclosure is directed to a beamforming apparatus 100 considering a multi-user simultaneous wireless information and power transfer system 10, and the base station having an $N_T$ (here, $N_T$ is a natural number) number of antennas may transmit information and energy simultaneously to a plurality of information users and a plurality of energy users having a single antenna.

That is, the base station including the $N_T$ (here, $N_T$ is a natural number) number of antennas may be provided as an m (here, m is a natural number) number of base stations $50a, \ldots, 50m$, and each base station $50a, \ldots, 50m$ may transmit an information signal or an energy signal to a plurality of information users $70a, \ldots, 70i$ or energy users $30a, \ldots, 30j$ included in the range where an information signal or an energy signal may be transmitted.

For example, one base station $50a$ may transmit an information signal to an i (here, i is a natural number) number of information users $70a_1, 70i_1$ included in a group of information users ($U_1^I$ ID user) included in the range where an information signal may be transmitted.

One base station $50a$ may transmit an energy signal to a j (here, j is a natural number) number of energy users $30a_1, 30j_1$ included in a group of energy users ($U_1^E$ EH user) included in the range where an energy signal may be transmitted.

In addition, the present disclosure may maximize the performance of the energy user in consideration of the transmission power while satisfying the quality of service (QoS) of the information user, and may also derive a harvested power in consideration of not only a linear model but also a non-linear model.

The result of applying the reception signal of the energy user to a linear model and a non-linear model in order to derive the harvested power will be described with reference to FIGS. 6 and 7.

Figure 6:
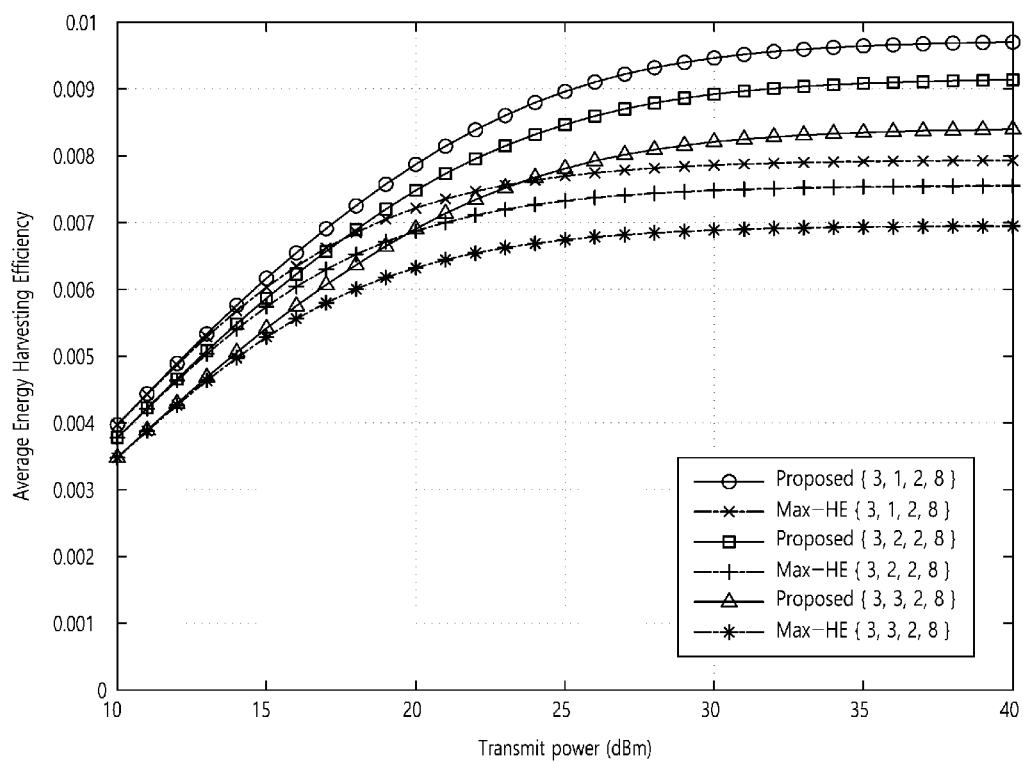
FIG. 6 is a diagram showing a linear harvested power derived by applying to a linear model of the beamforming method in a simultaneous wireless information and power transfer system according to the present disclosure.
Figure 7:
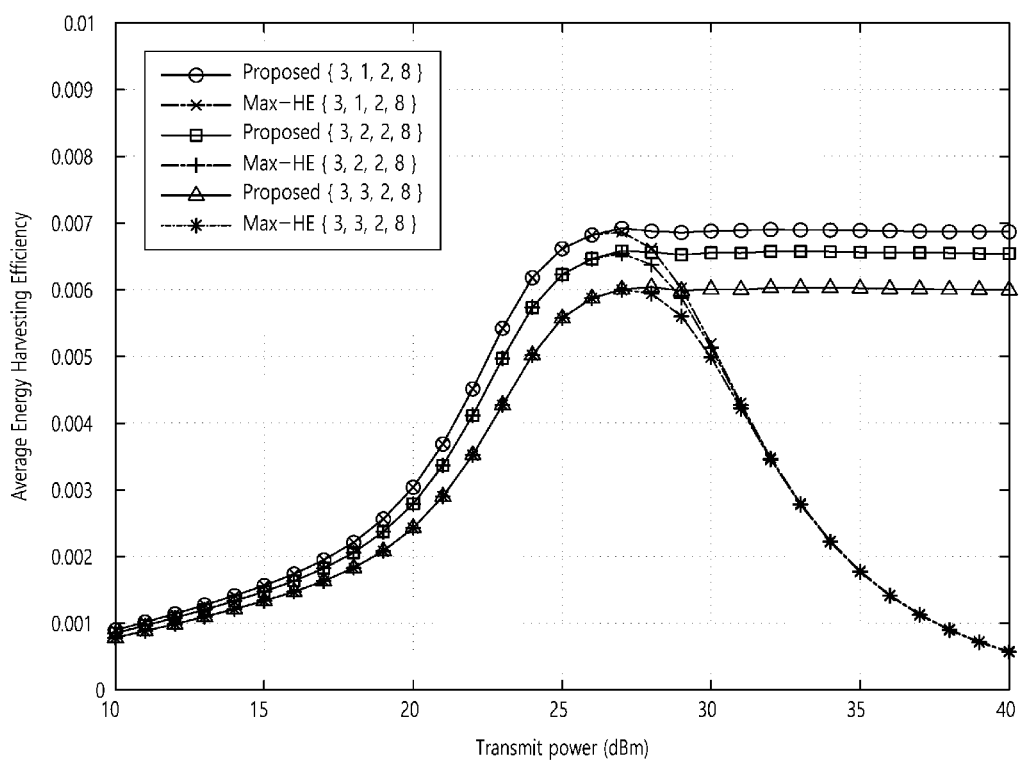
FIG. 7 is a diagram showing a non-linear harvested power derived by applying to a non-linear model of the beamforming method in a simultaneous wireless information and power transfer system according to the present disclosure.

FIGS. 6 and 7 are diagrams showing results obtained by applying the beamforming method in the simultaneous wireless information and power transfer system proposed in the present disclosure to a linear model and a non-linear model, respectively.

Referring to FIG. 6, it may be found that the beamforming method in the simultaneous wireless information and power transfer system 10 proposed by the present disclosure is performed similar to max-HE (a technique for maximizing only a numerator of EHE in [Equation 9]).

However, as the transmission power increases, it may be found that the technique proposed in the present disclosure has better performance than the max-EH technique.

In addition, referring to FIG. 7, it may be found that the beamforming method in the simultaneous wireless information and power transfer system 10 proposed by the present disclosure is not performed similar to the beamforming maximum value (max-HE).

The non-linear harvested power ($E_{jm}^{Non-linear}$) derived by the beamforming method proposed by the present disclosure is generated as a value greater than the max-HE method because when transmitting the power of the transmission signal of the antenna, the magnitude of power consumed by the max-HE technique is greater than the magnitude of power consumed by the technique proposed in the present disclosure.

As described above, the beamforming method of the present disclosure improves the effect of minimizing the transmission power of the base station and maximizing the harvested power of the energy users, while satisfying the QoS (Quality of Service) and transmission power limitation of the information users.

The beamforming method in a simultaneous wireless information and power transfer system as described above may be implemented as an application or in the form of program commands that may be executed through various computer components, and may be recorded in a computer-readable recording medium. The computer-readable recording medium may include a program command, a data file, a data structure, or the like alone or in combination.

The program commands recorded in the computer-readable recording medium may be specially designed and constructed for the present disclosure and may be already known to and usable by those skilled in the computer software field.

Examples of the computer-readable recording medium include magnetic media such as hard disks, floppy disks and magnetic tapes, optical recording media such as CD-ROMs and DVDs, magnetic-optical media such as floptical disks, and hardware devices specially configured to store and execute program commands such as ROM, RAM and flash memories.

Examples of the program command include not only machine language codes produced by a compiler but also high-level language codes that may be executed by a computer using an interpreter or the like. The hardware device may be configured to operate as one or more software modules to perform the processing according to the present disclosure, or vice versa.

Although the present disclosure has been described with reference to embodiments, it would be understood that various modifications and changes can be made by those skilled in the art from the present disclosure without departing from the idea and scope defined in the appended claims.

REFERENCE SIGNS

10: simultaneous wireless information and power transfer system
100: beamforming apparatus in a simultaneous wireless information and power transfer system
110: signal deriving unit
130: noise deriving unit
150: harvested power deriving unit
151: first deriving unit
155: second deriving unit
159: coupling unit
170: forming unit
$30a, \ldots, 30j$: energy user
$50a, \ldots, 50m$: antenna
$70a, \ldots, 70i$: information user

The invention claimed is:

1. A beamforming method in a simultaneous wireless information and power transfer system, the method comprising:
deriving a transmission signal transmitted to a plurality of information users and a plurality of energy users from a base station;
deriving a signal-to-interference-plus-noise ratio (SINR) of an $i^{th}$ information user by using a noise power of the $i^{th}$ information user included in a $m^{th}$ cell including one base station having a plurality of information users and energy users, i and m each being a natural number;

deriving a total harvested power ($E_{jm}$) of a $j^{th}$ energy user included in the $m^{th}$ cell, wherein the deriving of the total harvested power comprises:

deriving a linear harvested power by applying the $j^{th}$ energy user of the $m^{th}$ cell to a linear model, deriving a non-linear harvested power by applying the $j^{th}$ energy user of the $m^{th}$ cell to a non-linear model; and deriving the total harvested power ($E_{jm}$) of the $j^{th}$ energy user of the $m^{th}$ cell by using the derived linear harvested power and the non-linear harvested power, j being a natural number;

deriving a total harvested power of the plurality of energy users from the derived total harvested power ($E_{jm}$); and performing beamforming that maximizes energy harvesting efficiency (EHE) by [Equation 1] by minimizing a transmission power ($P_{total}$) of the derived transmission signal of the base station and maximizing the total harvested power of the plurality of energy users derived from the derived total harvested power ($E_{jm}$) while satisfying QoS (Quality of Service) of the plurality of information users, $$\max EHE = \frac{\text{total harvested power of energy users}}{\text{transmission power at base station}} = \frac{\sum_{m \in M} \sum_{j \in u_m^E} E_{jm}}{P_{total}},$$ [Equation 1]

wherein M is an arbitrary-size matrix, and $u_m^E$ means a group of the plurality of energy users of the $m^{th}$ cell.

2. The beamforming method in a simultaneous wireless information and power transfer system according to claim 1, wherein said deriving of the linear harvested power includes:

deriving the linear harvested power ($E_{jm}^{Linear}$) by [Equation 2] to derive the total harvested power for the $j^{th}$ energy user of the $m^{th}$ cell, and wherein $p_{jm}^{EH}$ means a reception signal power ($p_{jm}^{EH}$) and $\eta_{jm}$ is a positive number between 0 and 1 to represent a power conversion efficiency ($\eta_{jm}$) of the $j^{th}$ energy user of the $m^{th}$ cell, $$E_{jm}^{Linear} = \eta_{jm} P_{jm}^{EH}.$$

3. The beamforming method in a simultaneous wireless information and power transfer system according to claim 1, wherein said deriving of the non-linear harvested power includes:

deriving the non-linear harvested power ($E_{jm}^{Non-linear}$) by [Equation 3] to derive the total harvested power for the $j^{th}$ energy user of the $m^{th}$ cell, wherein $M_{jm}$ means a maximum harvested power ($M_{jm}$), $a_{jm}$ means a charging rate ($a_{jm}$) and $b_{jm}$ means a sensitivity ($b_{jm}$) of the $j^{th}$ energy user of the $m^{th}$ cell, which are parameters of the non-linear model, $$E_{jm}^{Nonlinear} = \frac{\frac{M_{jm}}{1 + \exp(-a_{jm}(P_{jm}^{EH} - b_{jm}))} - M_{jm}\Omega_{jm}}{1 - \Omega_{jm}},$$ [Equation 3]

and wherein $\Omega_{jm}$ is calculated by [Equation 4], $$\Omega_{jm} \triangleq \frac{1}{1 + \exp(a_{jm}b_{jm})}.$$ [Equation 4]

4. The beamforming method in a simultaneous wireless information and power transfer system according to claim 1, wherein said performing of beamforming includes:

non-linearly optimizing the transmission power of the derived transmission signal of the base station and the total harvested power of the plurality of energy users based on QoS (Quality of Service) of the plurality of information users.

5. A non-transitory computer-readable recording medium, in which a computer program that when executed by a computer, performs the beamforming method in a simultaneous wireless information and power transfer system according to claim 1.

6. A beamforming apparatus in a simultaneous wireless information and power transfer system, the beamforming apparatus comprising a forming circuit, and a computer processor configured to:

derive a transmission signal transmitted to a plurality of information users and a plurality of energy users from a base station;

derive a signal-to-interference-plus-noise ratio (SINR) of an $i^{th}$ information user by using a noise power of the $i^{th}$ information user included in a $m^{th}$ cell including one base station having a plurality of information users and energy users, i and m each being a natural number;

derive a total harvested power ($E_{jm}$) of a $j^{th}$ energy user included in the $m^{th}$ cell, including:

deriving a linear harvested power by applying the $j^{th}$ energy user of the $m^{th}$ cell to a linear model, deriving a non-linear harvested power by applying the $j^{th}$ energy user of the $m^{th}$ cell to a non-linear model; and deriving the total harvested power ($E_{jm}$) of the $j^{th}$ energy user of the $m^{th}$ cell by using the derived linear harvested power and the non-linear harvested power, j being a natural number;

deriving a total harvested power of the plurality of energy users from the derived total harvested power ($E_{jm}$); and perform beamforming, with the forming circuit, that maximizes energy harvesting efficiency (EHE) by [Equation 1] by minimizing a transmission power (Ptotal) of the derived transmission signal of the base station and maximizing the total harvested power of the plurality of energy users derived from the derived total harvested power ($E_{jm}$) while satisfying QoS (Quality of Service) of the plurality of information users, $$\max EHE = \frac{\text{total harvested power of energy users}}{\text{transmission power at base station}} = \frac{\sum_{m \in M} \sum_{j \in u_m^E} E_{jm}}{P_{total}},$$ [Equation 1]

wherein M is an arbitrary-size matrix, and $u_m^E$ means a group of the plurality of energy users of the $m^{th}$ cell.

7. The beamforming apparatus in a simultaneous wireless information and power transfer system according to claim 6,
wherein the computer processor is further configured to derive the linear harvested power ($E_{jm}^{Linear}$) by [Equation 2], and
wherein $p_{jm}^{EH}$ is a reception signal power ($p_{jm}^{EH}$) and $\eta_{jm}$ is a positive number between 0 and 1 to represent a power conversion efficiency ($\eta_{jm}$) of the $j^{th}$ energy user of the $m^{th}$ cell, $$E_{jm}^{Linear} = \eta_{jm} P_{jm}^{EH}.$$

8. The beamforming apparatus in a simultaneous wireless information and power transfer system according to claim 6,
wherein the computer processor is further configured to derive the non-linear harvested power ($E_{jm}^{Non-linear}$) by [Equation 3],
wherein $M_{jm}$ means a maximum harvested power ($M_{jm}$), $a_{jm}$ means a charging rate ($a_{jm}$), and $b_{jm}$ means a sensitivity ($b_{jm}$) of the $j^{th}$ energy user of the $m^{th}$ cell, which are parameters of the non-linear model, $$E_{jm}^{Nonlinear} = \frac{\frac{M_{jm}}{1+\exp(-a_{jm}(P_{jm}^{EH}-b_{jm}))} - M_{jm}\Omega_{jm}}{1-\Omega_{jm}}, \quad \text{[Equation 3]}$$

and wherein $\Omega_{jm}$ is calculated by [Equation 4], $$\Omega_{jm} \triangleq \frac{1}{1+\exp(a_{jm}b_{jm})}. \quad \text{[Equation 4]}$$

9. The beamforming apparatus in a simultaneous wireless information and power transfer system according to claim 6,
wherein the computer processor is further configured to non-linearly optimize the transmission power of the derived transmission signal of the base station and the total harvested power of the plurality of energy users based on Quality of Service (QoS) of the plurality of information users.

* * * * *